Oct. 1, 1929.　　F. C. REED ET AL　　1,730,293
HEAT INTERCHANGER
Filed Aug. 1, 1927　　3 Sheets-Sheet 2

Inventors
Frank A. Ernst
Forrest C. Reed
By W. N. Roach
Attorney

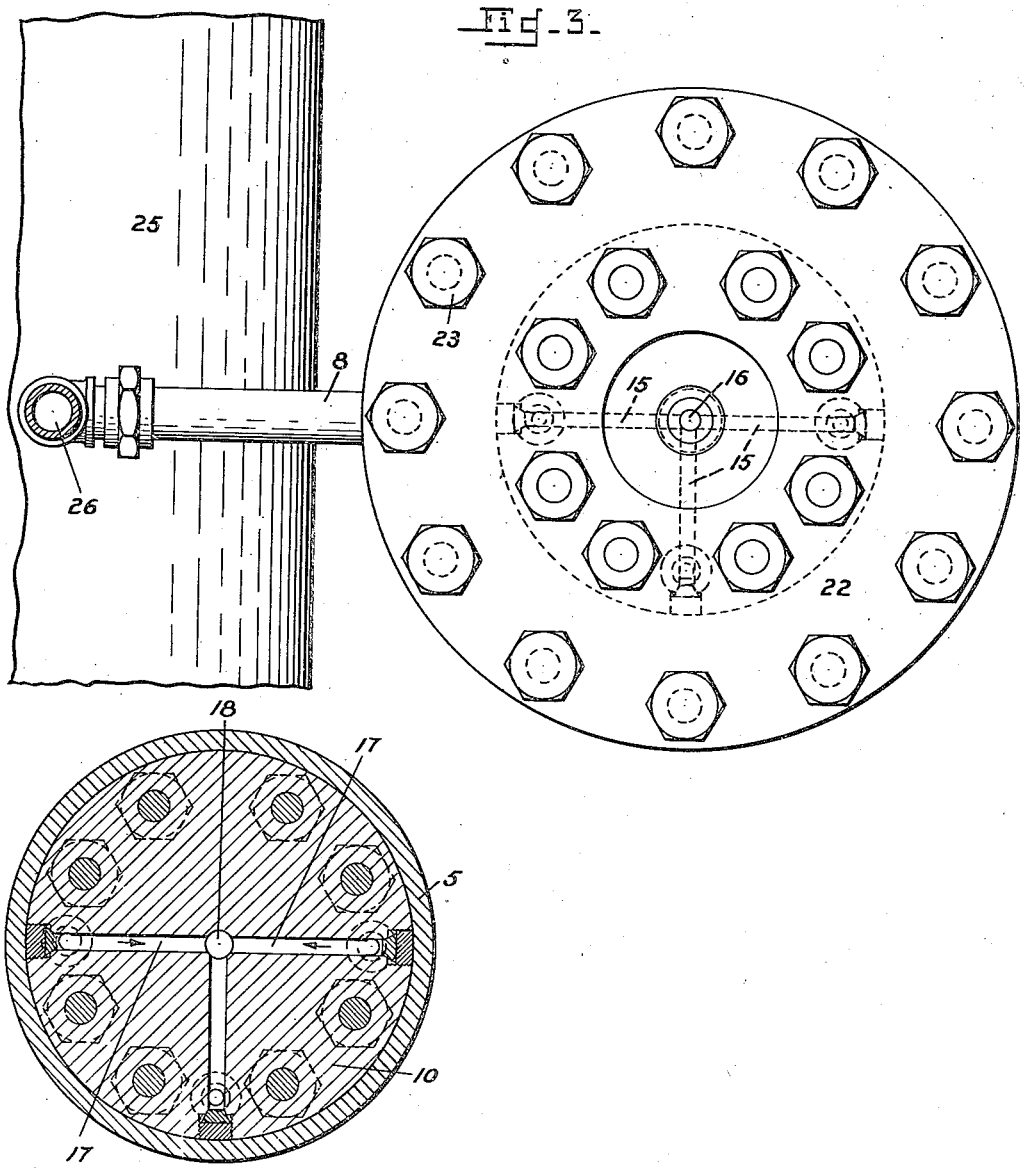

Patented Oct. 1, 1929

1,730,293

UNITED STATES PATENT OFFICE

FORREST C. REED, OF SAN FRANCISCO, CALIFORNIA, AND FRANK A. ERNST, OF SOMERSET, MARYLAND

HEAT INTERCHANGER

Application filed August 1, 1927. Serial No. 209,850.

The present invention relates to heat interchangers used in connection with high pressures.

Modern methods of calculating heat interchangers show that for the same pressure drop a number of small tubes in parallel give a greater heat transmission per square foot per degree difference in temperature than a single tube of larger diameter. When such heat interchangers are used in processes requiring high pressures, it is necessary from the standpoint of strength to keep the diameter of tubes as small as possible in order to use a tube having a thin wall which also gives a better heat transmission; but in order to keep the pressure drop, due to the velocity of flow through the tubes, within reasonable limits when using a relatively small diameter of tube, the number of tubes must be increased.

Modern practice has also shown that, in order to secure what is known to those skilled in the art as turbulent flow and thereby the best transmission of heat, it is necessary to restrict as much as possible the area around the outside and between such tubes.

The usual construction of such a heat interchanger is such that it becomes easily clogged up and is difficult to clean; and furthermore such construction cannot be readily tested for high pressures after assembling.

The present invention has, therefore, for its objects to provide a heat interchanger with a plurality of tubes closely and spirally wound so as to give a maximum of heat interchange with a minimum of pressure drop; to restrict the area around such tubes in order to cause a turbulent flow outside of tubes; to provide means for connecting all of such tubes into one common header, especially adaptable for high pressures; to provide means for removing such heat interchanger as a unit from its outer casing for purposes of testing joints and cleaning; and to secure simplicity of construction and other advantages as may be brought out in the following description and drawings.

A practical embodiment of the invention is illustrated in the drawing, wherein:

Fig. 3 is a plan view of Fig. 2;

Fig. 4 is a section on line 4—4 of Fig. 2.

Figure 1:
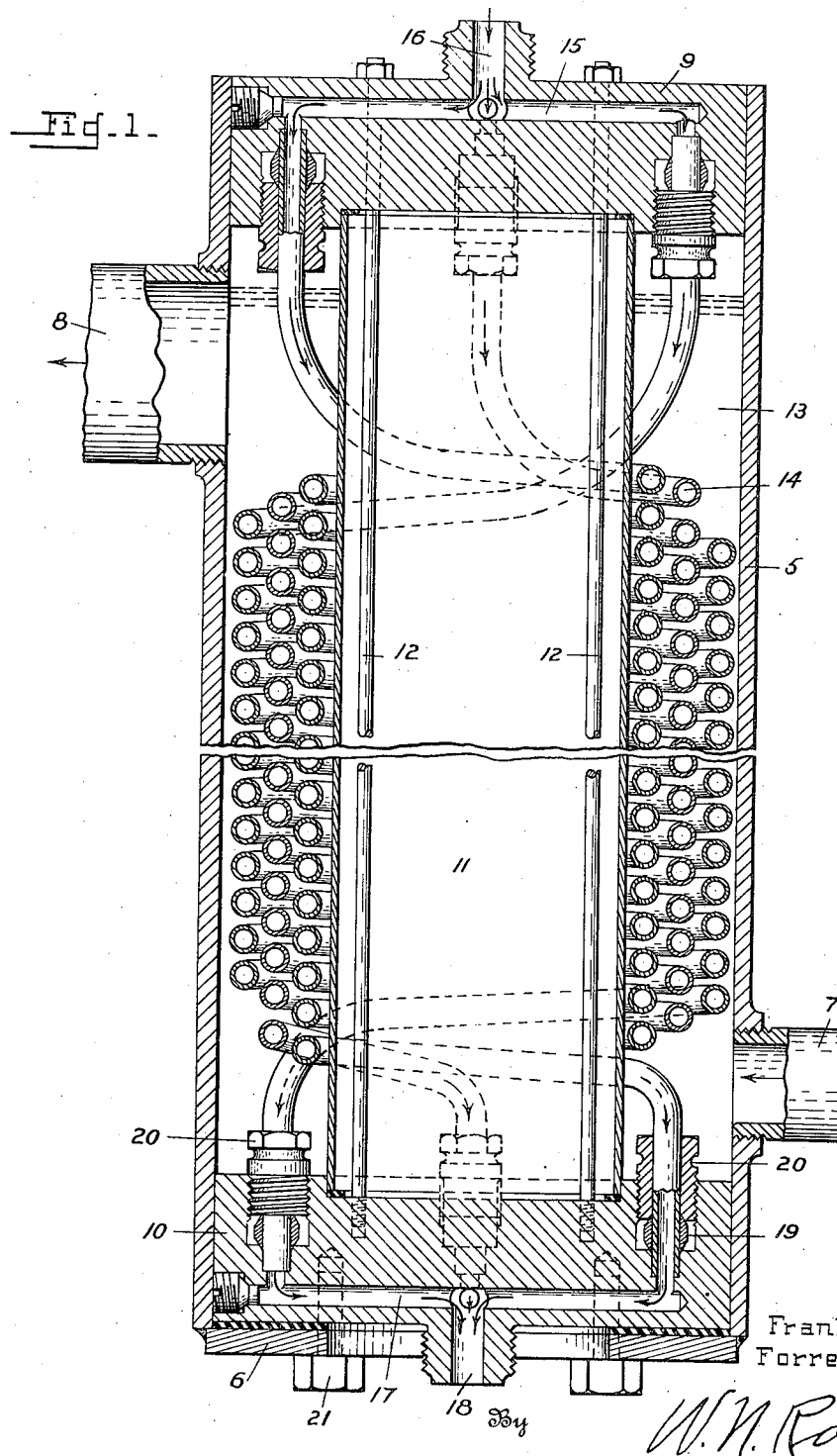
Fig. 1 is a longitudinal sectional view of a heat interchanger constructed in accordance with the present invention.

Referring to the drawings by numerals of reference:

The heat interchanger shown in Fig. 1 is especially designed for use of a cooling medium which is not under pressure and comprises a cylindrical container formed of a tube 5 having secured to one end, as by welding, an annular base plate 6 and provided with an inlet connection 7 and an outlet connection 8.

The header assembly is arranged to be introduced into the container as a unit and to this end the upper and lower headers, respectively, 9 and 10 are spaced by means of a concentric tube 11 and held together by means of tie rods 12. The tube 11 is spaced from the tube 5 in order to establish an annular chamber 13 of restricted area to promote turbulent flow. In this chamber are disposed a plurality of coiled tubes 14 herein shown as three in number. The tubes are all in communication with a passage 15 in the upper header leading to an inlet 16 and also with a passage 17 in the lower header leading to an outlet 18. The tubes may be connected to the headers in any suitable manner, the specific connection herein shown consisting of a double conical sleeve 19 closely fitting on the tube and engaged by a gland 20 threaded into the header.

The header unit is secured to the container by means of the bolts 21 which are threaded into the lower header and the unit may thereby be readily removed for the purposes of inspection and cleaning.

In operation the cooling medium will preferably be admitted to the apparatus at 7 and discharged at 8. The fluid or gas to be cooled will preferably enter through the top header and be discharged through the lower header although a reversal of flow will function suitably.

Figure 2:
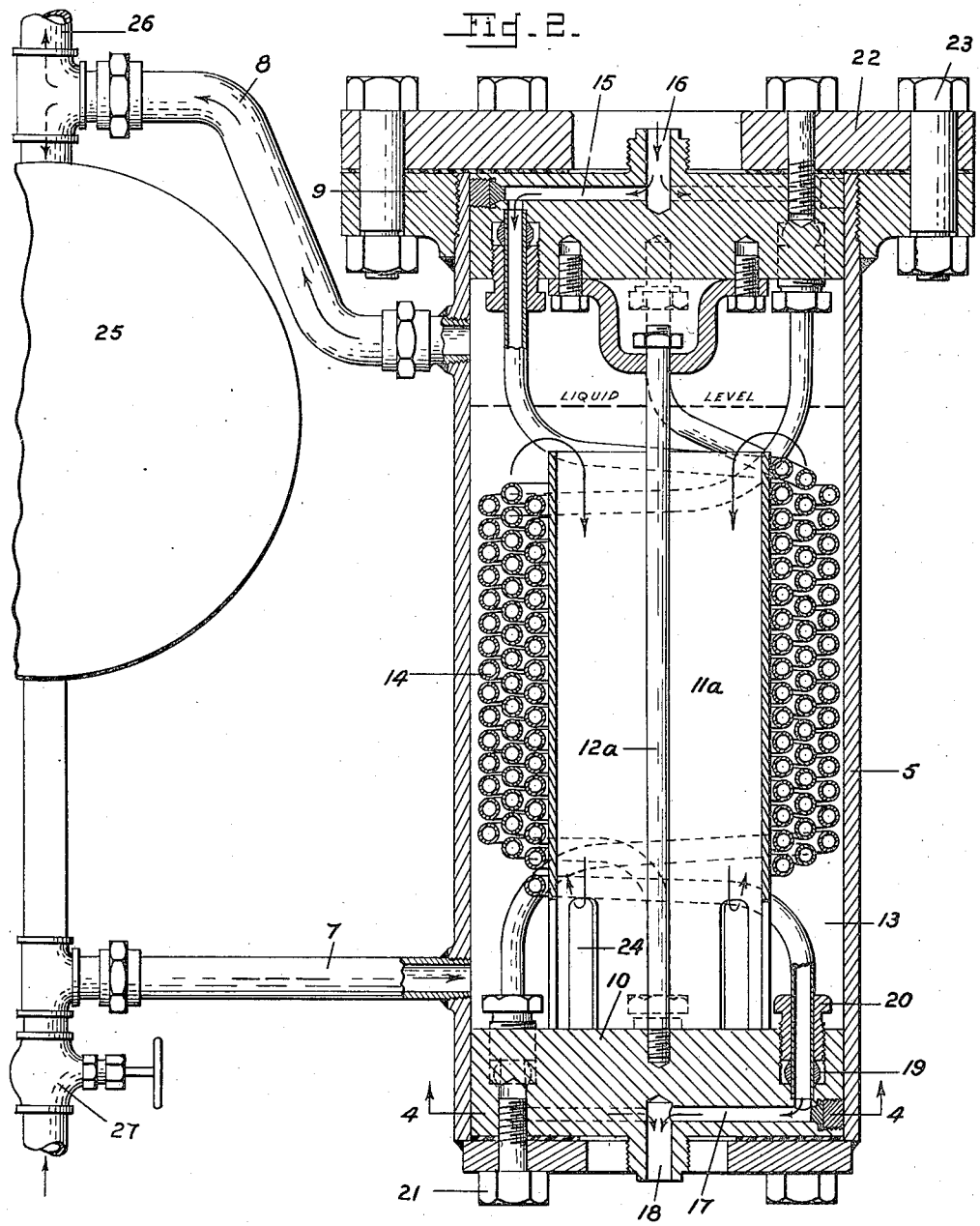
Fig. 2 is a similar view of a modified construction of heat interchanger.

The apparatus shown in Fig. 2 resembles that just described but because it is adapted for use of a cooling medium having a low boiling point, such as liquid ammonia, the container is provided with a cover plate 22 which is removably attached by means of bolts 23 to enable the header unit to be introduced into the container. By reason of the character of the cooling medium, the container and header are so formed as to provide a gas tight joint. The inner tube 11ª, which in this case is attached to the lower head and does not extend to the upper header restricts the area surrounding the coiled tubes and is provided with openings 24 at its lower end so as to allow a circulation of the cooling medium as indicated by the arrows. Circulation is produced by the transfer of heat which lowers the density of the cooling medium in contact with the coiled tubes thereby causing it to rise upwardly.

An axial bolt 12ª forms a rigid connection between the headers and thereby avoids strains on the coiled tubes during insertion and removal of the unit from the container.

In operating a heat interchanger of this character it is desirable but not essential to use an auxiliary accumulator reservoir 25 in the cooling circulating system, said reservoir having a considerably greater capacity than that of the heat interchanger so as to maintain a nearly constant level of the liquid cooling medium thereby preventing fluctuations in temperature due to irregular supply or evaporations of the cooling medium. The cooling medium will evaporate at a rate sufficient to be maintained at a temperature corresponding to the pressure at which evaporation takes place. The vaporized cooling medium is led through the pipe 26 either to an acid or water absorber (not shown) or it is recompressed, liquefied and returned to the circulating system through the valve 27.

We claim:

1. A heat interchanger embodying a tubular container, an annular base plate fixed to one end thereof, and a removable header unit comprising headers fitting within the container and constituting closures therefor, means for rigidly holding the headers in spaced relation, including a tube between the headers and spaced from the container to form a chamber, a plurality of coiled tubes disposed in said chamber and connected to the headers and means for securing said header unit to the base plate.

2. A heat interchanger embodying a cylindrical container, and a removable header unit comprising headers, means for holding the headers in spaced relation, including a tube between imperforate portions of the headers and spaced from the container to form an annular chamber, a plurality of coiled tubes disposed in said chamber and connected to the headers and means for securing said header unit to the container.

3. A heat interchanger embodying a cylindrical container and a removable header unit comprising spaced headers, connecting means for said headers, a concentric tube confined between said headers and spaced from the container to form a chamber, coiled tubes in said chamber connected to the headers and having a common inlet in one header and a common outlet in the other header and means for securing said unit to the container.

4. A heat interchanger embodying a tubular container, an annular base plate fixed to one end thereof, a removable header unit comprising rigidly spaced headers fitting within the container and constituting closures therefor, a tube between imperforate portions of the headers and spaced from the container to form an annular chamber, a plurality of coiled tubes in said chamber connected to the headers and having a common inlet in one header and a common outlet in the other and means for securing said header unit to the base plate.

5. A heat interchanger embodying a tubular container, a removable header unit comprising spaced headers having a sliding fit in the container and constituting closures therefor, coiled tubes connected to the headers and means for securing the header unit to the container.

FORREST C. REED.
FRANK A. ERNST.